US012601612B2

(12) United States Patent
Yamamoto et al.

(10) Patent No.: US 12,601,612 B2
(45) Date of Patent: Apr. 14, 2026

(54) VEHICLE SYSTEM INCLUDING SENSOR UNIT FOR DETECTING MAGNETIC MARKER LAID ON A ROAD

(71) Applicant: Aichi Steel Corporation, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 141 days.

(21) Appl. No.: 18/289,893

(22) PCT Filed: May 11, 2022

(86) PCT No.: PCT/JP2022/019881
§ 371 (c)(1),
(2) Date: Nov. 8, 2023

(87) PCT Pub. No.: WO2022/239787
PCT Pub. Date: Nov. 17, 2022

(65) Prior Publication Data
US 2024/0247951 A1     Jul. 25, 2024

(30) Foreign Application Priority Data
May 12, 2021   (JP) ................................. 2021-081220

(51) Int. Cl.
G01D 5/14 (2006.01)
(52) U.S. Cl.
CPC ..................................... G01D 5/14 (2013.01)
(58) Field of Classification Search
CPC ...................................................... G01D 5/14
See application file for complete search history.

(56) References Cited

U.S. PATENT DOCUMENTS 5,815,825 A * 9/1998 Tachibana ............ G05D 1/0293
318/587
5,913,375 A * 6/1999 Nishikawa ............... B62D 6/00
701/28
(Continued)

FOREIGN PATENT DOCUMENTS

JP         2001-167389 A        6/2001
JP         2005-202478 A        7/2005
(Continued)

OTHER PUBLICATIONS

International Search Report and Written Opinion mailed on Jul. 26, 2022, received for PCT Application PCT/JP2022/019881, filed on May 11, 2022, 9 pages including English Translation.

*Primary Examiner* — Walter L Lindsay, Jr.
*Assistant Examiner* — Milton Gonzalez
(74) *Attorney, Agent, or Firm* — XSENSUS LLP

(57) ABSTRACT

A vehicle system includes a sensor unit including magnetic sensors for detecting a magnetic marker and non-contact displacement sensors which measure a displacement relative to a road surface where the magnetic marker is laid, a processing circuit which performs detection process for detecting the magnetic marker by processing a magnetic measurement value by the plurality of magnetic sensors, and a switching circuit which switches the detection process in accordance with displacement measurement values by the non-contact displacement sensors. By switching the detection process in accordance with the displacement measurement values by the non-contact displacement sensors, the magnetic marker can be detected with high reliability.

20 Claims, 10 Drawing Sheets

(56)                    References Cited

U.S. PATENT DOCUMENTS

| 5,957,983 | A | * | 9/1999 | Tominaga | ............ | G05D 1/0261 |
| | | | | | | 701/41 |
| 6,336,064 | B1 | * | 1/2002 | Honkura | ................ | G01C 21/26 |
| | | | | | | 180/167 |
| 6,512,978 | B2 | | 1/2003 | Suzuki | | |
| 6,971,464 | B2 | * | 12/2005 | Marino | ................ | G05D 1/0263 |
| | | | | | | 180/167 |
| 8,406,949 | B2 | * | 3/2013 | Kondo | ................ | G05D 1/0265 |
| | | | | | | 701/23 |
| 11,604,476 | B1 | * | 3/2023 | Leefer | .................... | H04L 67/12 |
| 2015/0247719 | A1 | * | 9/2015 | Huang | ................ | B62D 15/025 |
| | | | | | | 701/41 |
| 2021/0215507 | A1 | | 7/2021 | Yamamoto et al. | | |
| 2022/0057807 | A1 | | 2/2022 | Yamada et al. | | |

FOREIGN PATENT DOCUMENTS

| JP | 2005-258941 | A | 9/2005 |
| JP | 2020-135711 | A | 8/2020 |
| SG | 11202011828 | W | 12/2020 |

* cited by examiner

START

IRRADIATE AND TAKE IMAGE ——S101

MAKE COMPARISON BETWEEN PREVIOUS IMAGE AND LATEST IMAGE ——S102

IDENTIFY DISPLACEMENT AMOUNT AND DISPLACEMENT DIRECTION ——S103

STORE LATEST IMAGE AS PREVIOUS IMAGE ——S104

OUTPUT DISPLACEMENT SIGNAL ——S105

RETURN

X DIRECTION

Y DIRECTION

LATEST IMAGE

PREVIOUS IMAGE

FIG. 8

VEHICLE SYSTEM INCLUDING SENSOR UNIT FOR DETECTING MAGNETIC MARKER LAID ON A ROAD

CROSS-REFERENCE TO RELATED APPLICATIONS

The present application is based on PCT filing PCT/JP2022/019881, filed May 11, 2022, which claims priority from Japanese Patent Application No. 2021-081220, filed May 12, 2021, the entire contents of each are incorporated herein by reference.

TECHNICAL FIELD

The present invention relates to a sensor unit and system for detecting a magnetic marker.

BACKGROUND ART

Conventionally, magnetic marker detection systems for vehicles for using magnetic markers laid in or on a road for vehicle control have been known (for example, refer to Patent Literature 1). This magnetic marker detection systems are achieved by a combination of the magnetic markers laid in or on the road and a magnetic marker detection device on a vehicle side including magnetic sensors. For example, if the magnetic marker laid along a lane of the road can be detected on the vehicle side, various driving assists can be achieved, such as automatic steering control and lane departure warning.

CITATION LIST

Patent Literature

Patent Literature 1: Japanese Unexamined Patent Application Publication No. 2005-202478

SUMMARY OF INVENTION

Technical Problem

However, the above-described conventional magnetic marker detection system has the following problem. That is, there is a problem in which reliability of magnetic marker detection may be impaired due to external disturbances of magnetism acting on the magnetic sensors. For example, in a bridge or tunnel in an RC structure configuring a road, an iron-made reinforcing plate, an iron bar, and so forth are stretched inside for ensuring structural strength. Since iron is a magnetic material, there is a possibility that the structure such as a bridge or tunnel serves as a large magnetism generation source. While residual magnetization of an iron material such as an iron bar is very little compared with a magnet, magnetism exceeding geomagnetism may occur due to the huge volume of the bridge or tunnel, or these structures may collect geomagnetism like yokes to cause a relatively large magnetic field to occur. The magnetic fields of various magnetism generation sources that are present on roads, such as, for example, bridges and tunnels, serves as one of factors in degrading magnetic marker detection reliability.

The present invention was made in view of the above-described conventional problem, and is to provide a sensor unit and system useful for detecting a magnetic marker with high reliability.

Solution to Problem

One mode of the present invention resides in a sensor unit to be attached to a movable body to detect a magnetic marker, the sensor unit including:

one or plurality of magnetic sensors which measures magnetism acting from the magnetic marker; and one or plurality of non-contact displacement sensors which measures a displacement relative to a surface where the magnetic marker is laid.

One mode of the present invention resides in a system for a movable body to detect a magnetic marker, wherein a sensor unit including:

one or plurality of magnetic sensors which measures magnetism acting from the magnetic marker; and one or plurality of non-contact displacement sensors which measures a displacement relative to a surface where the magnetic marker is laid, is attached to the movable body.

Advantageous Effects of Invention

The present invention has one technical feature in the sensor unit having the non-contact displacement sensor incorporated therein, in addition to the magnetic sensor. According to this sensor unit, magnetism occurring from the magnetic marker can be measured, and a displacement relative to the surface where the magnetic marker is laid can be measured by using the non-contact displacement sensor.

In the configuration of the present invention, the result of measurement of the displacement relative to the surface where the magnetic marker is laid can be used in the detection of the magnetic marker. The result of measurement of the displacement relative to the surface where the magnetic marker is laid is effective for eliminating external disturbances of magnetism derived from factors other than the magnetic marker, and is useful for improving detection reliability in the detection of the magnetic marker.

BRIEF DESCRIPTION OF DRAWINGS

FIG. 8 is a descriptive diagram depicting changes with time of distribution waveforms of a magnetic gradient in the vehicle-width direction while passing over a magnetic marker.

3

Figure 10:
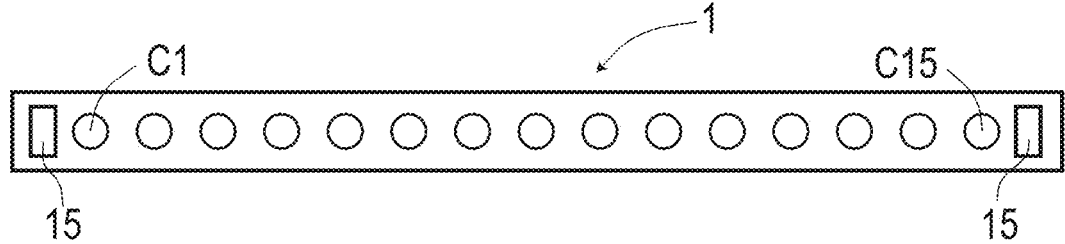

FIG. 10 is a block diagram depicting another sensor unit.

DESCRIPTION OF EMBODIMENTS

An embodiment of the present invention is specifically described by using the following embodiment.

First Embodiment

The present embodiment is an example regarding vehicle onboard sensor unit 1 which detects magnetic marker 10 laid on a road. Details of this are described by using FIG. 1 to FIG. 10.

In the present embodiment, vehicle system 1S (FIG. 1 and FIG. 2) which achieves driving assist control of vehicle 5 by using magnetic marker 10 are exemplarily described. Vehicle 5 including sensor unit 1 can detect magnetic marker 10 while traveling a road where magnetic markers 10 are laid. For example, magnetic markers 10 are laid along the center of lane 100, which a traveling area of the vehicle on the road. Vehicle system 1S is one example of a system which uses magnetic markers 10 laid along lane 100 to achieve driving assist control such as, for example, lane keeping control.

Vehicle 5 configuring vehicle system 1S forms one example of a movable body. This vehicle 5 includes sensor unit 1 for detecting magnetic marker 10, main circuit 20 which performs marker detection process and so forth, vehicle ECU 30 which performs driving assist control, and so forth. In the following, after magnetic marker 10 is described, the configuration and operation of vehicle system 1S are described.

Magnetic marker 10 is a flat sheet-shaped magnet having a diameter of 100 mm and a thickness of 1.5 mm. Magnetic marker 10 can be adhered by, for example, bonding or the like to road surface 100S of a road. Magnetic markers 10 forming individual pieces are laid, for example, with 2-meter pitches along the center of lane 100. Here, road surface 100S is one example of a surface where magnetic markers 10 are laid. As a magnetic marker, in place of the sheet-shaped one of the present embodiment, for example, a columnar-shaped magnetic marker having a diameter of 28 mm and a height of 20 mm may be adopted. In the case of a columnar-shaped magnetic marker, this is preferably laid, for example, in a state of being accommodated in a hole bored in road surface 100S. Road surface 100S with these columnar-shaped magnetic markers buried therein is also one example of the surface of where the magnetic markers are laid.

Figure 1:
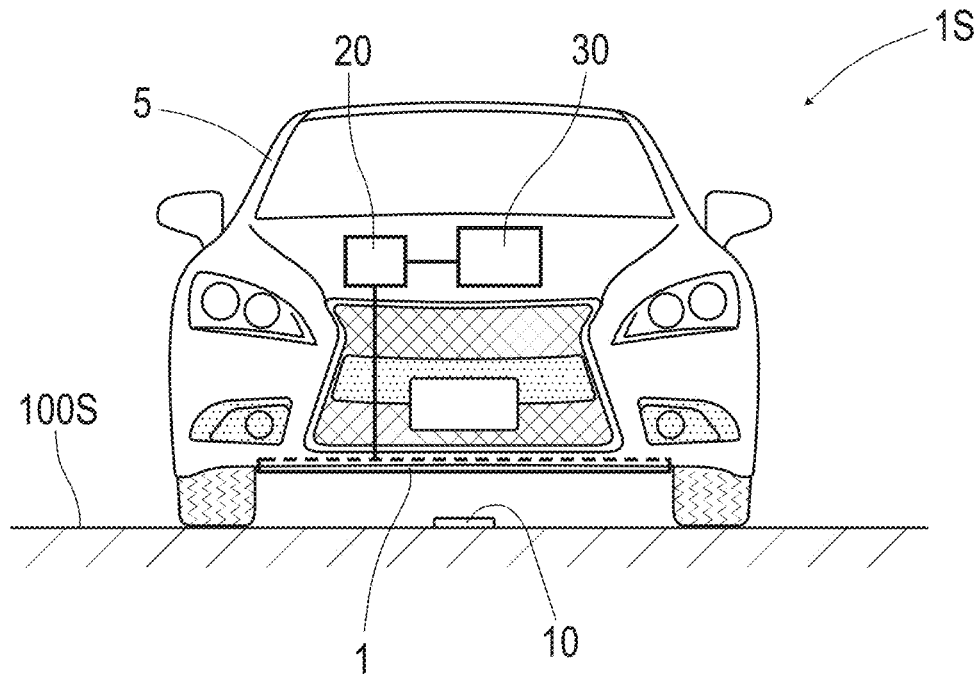
FIG. 1 is a front view of a vehicle to which a sensor unit is attached.
Figure 2:
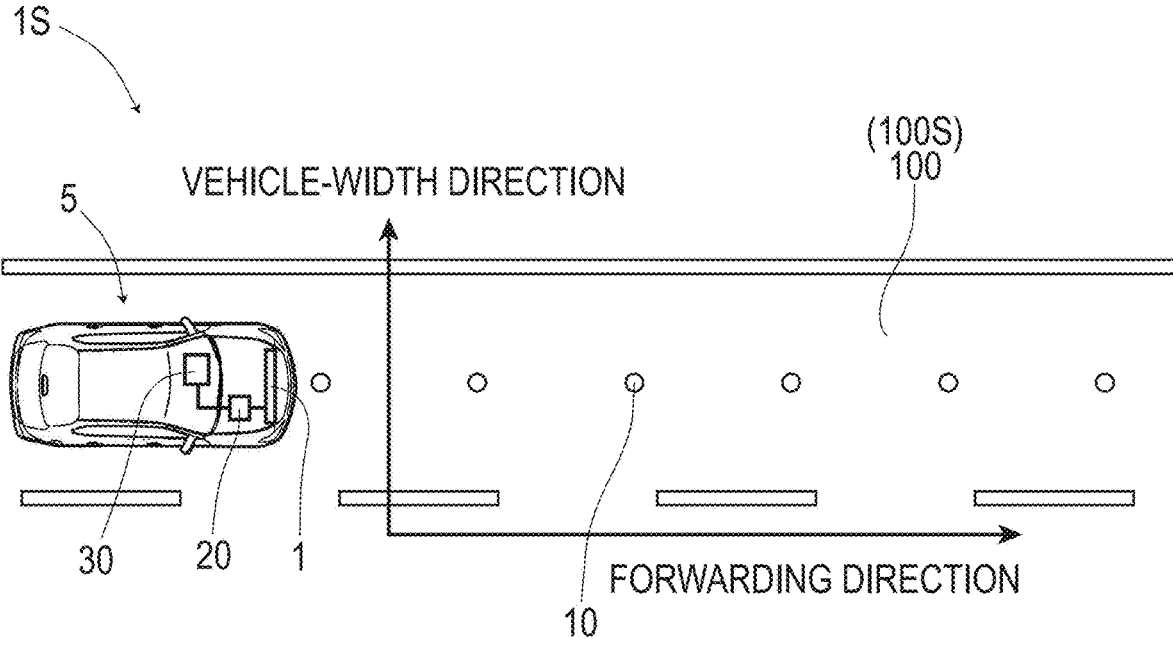
FIG. 2 is a descriptive diagram depicting a state in which a vehicle travels a lane where magnetic markers are laid.
Figure 3:
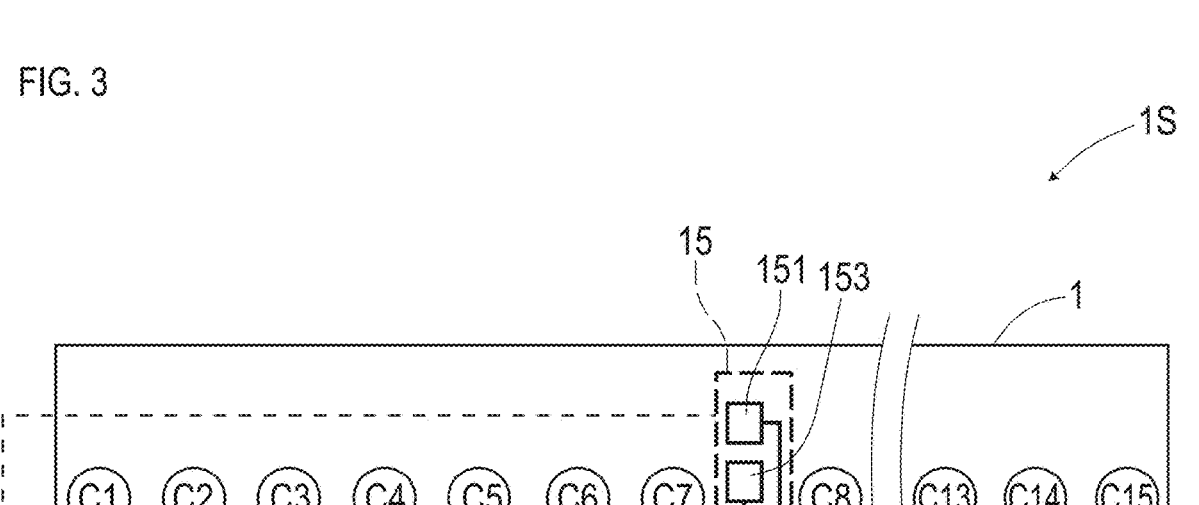
FIG. 3 is a block diagram depicting the configuration of the sensor unit and a main circuit.

Sensor unit 1 is a vehicle onboard unit as in FIG. 3, wherein fifteen magnetic sensors Cn (n is an integer of 1 to 15), differential circuit Gm (m is an integer of 1 to 14), and non-contact displacement sensor 15 which measures a displacement amount relative to road surface 100S are incorporated and integrated. Sensor unit 1 includes an input port and an output port. As an input port, there is at least an input port for main circuit 20 to input a control signal. As an output port, there are at least two types as follows. A first output port is an output port of fourteen channels outputting sensor signals (hereinafter referred to as magnetic signals) which are generated by preprocess (differential calculation) with magnetic measurement values from each magnetic sensor Cn. A second output port is an output port for a sensor signal (hereinafter referred to as a displacement signal) of non-contact displacement sensor 15.

In sensor unit 1, fifteen magnetic sensors Cn are arrayed equidistantly with 10-centimeter pitches on a single straight line. With this, sensor unit 1 exhibits an elongated rod shape as a whole. Sensor unit 1 is attached, for example, inside the front bumper of vehicle 5 along a vehicle-width direction. In vehicle 5 exemplarily described, the attachment height of sensor unit 1 with reference to road surface 100S is 200 mm.

Magnetic sensors Cn are highly-sensitive MI sensors which detect magnetism by using the known MI effect (Magneto Impedance Effect). The MI effect is an electromagnetic effect in which the impedance of a magneto-sensitive body such as an amorphous wire sensitively changes in response to the external magnetic field. MI sensors have detection sensitivity in an axial direction (longitudinal direction) of the amorphous wire as a magneto-sensitive body.

In rod-shaped sensor unit 1, magnetic sensors Cn are arrayed along the longitudinal direction. Each magnetic sensor Cn is incorporated so that the axial direction of the amorphous wire matches the longitudinal direction of sensor unit 1. As described above, sensor unit 1 is attached along the vehicle-width direction. Thus, the axial direction of the amorphous wire of each magnetic sensor Cn of sensor unit 1 goes along the vehicle-width direction. Magnetic sensor Cn is a highly-sensitive sensor with a measurement range of magnetic flux density of ±0.6 mT (milliteslas) and a magnetic flux resolution of 0.02 T in the measurement range. Furthermore, this magnetic sensor Cn can make magnetic measurement with a rapid cycle of 3 kHz, and support also high-speed vehicle traveling. Note in sensor unit 1 of the present embodiment that magnetic sensor C1 is attached to vehicle 5 so as to be positioned on a left side (passenger-side of the right-hand vehicle).

Differential circuit Gm is a circuit which performs differential calculation of magnetic measurement values by two magnetic sensors as preprocess. Differential circuit Gm is individually provided so as to correspond to each of fourteen sets as combinations of two magnetic sensors adjacent to each other among fifteen magnetic sensors Cn. According to differential circuit Gm, a magnetic gradient in an arraying direction (corresponding to the vehicle-width direction) of the magnetic sensors can be calculated. Differential calculation values (magnetic gradient in the vehicle-width direction) by differential circuit Gm are outputted from sensor unit 1 as a magnetic signals. Note that sensor unit 1 includes an output port of fourteen channels not depicted in the drawings so as to simultaneously output differential calculation values of differential circuit Gm. Note that differential circuit Gm includes a function as a sampling circuit which acquires magnetic measurement values by magnetic sensors Cn. Differential circuit Gm as a sampling circuit acquires a magnetic measurement value with a cycle of 3 kHz at which magnetic sensors Cn performs magnetic measurement.

Non-contact displacement sensor 15 is a sensor which detects a displacement relative to road surface 100S. Non-contact displacement sensor 15 is disposed, for example, so as to be adjacent to magnetic sensor C8 positioned at the center in sensor unit 1. In the configuration of the present embodiment, non-contact displacement sensor 15 is disposed at a position corresponding to a gap between magnetic sensor C7 and magnetic sensor C8.

Non-contact displacement sensor 15 includes light-source element 151 of blue laser light, image pickup element 153 which takes an image of road surface 100S, and displacement measurement circuit 150 which processes a taken image.

Light-source element 151 is an element which irradiates an area having some extent on road surface 100S with blue laser light. Image pickup element 153 is a camera which takes an image of an area to be irradiated by light-source element 151. Image pickup element 153 is controlled so as to perform image-taking operation in synchronization with light-emitting operation of light-source element 151.

Displacement measurement circuit 150 is a circuit which performs displacement measurement on successive images temporally successively taken. Displacement measurement circuit 150 shifts and superposes a temporally previous image in a temporally subsequent image to check a degree of matching. Then, displacement measurement circuit 150 identifies a shift amount with which the temporally previous image most matches the subsequent image, thereby measuring a displacement of vehicle 5. The displacement (displacement measurement value such as a displacement amount or displacement direction) measured as described above is outputted from non-contact displacement sensor 15 as a displacement signal. Note that specific details of displacement measurement will be described in detail further below.

Vehicle system 1S is, as described above, a system for achieving driving assist control such as lane keeping control. Vehicle system 1 is configured to include, in addition to sensor unit 1 described above, main circuit 20 which performs marker detection process, vehicle ECU 30 which controls a steering actuator, and so forth. Note in vehicle system 1 that a processing circuit which performs a process of detecting magnetic marker 10 is configured of differential circuits Gm of sensor unit 1 and main circuit 20.

The result of the marker detection process by main circuit 20 is outputted from main circuit 20 and inputted to vehicle ECU 30. While details will be described further below, the result of the marker detection process includes a lateral shift amount of vehicle 5 with respect to detected magnetic marker 10. Vehicle ECU 30 controls the steering actuator to adjust the steered angle so as to bring this lateral shift amount close to zero.

Main circuit 20 (FIG. 3) is a circuit which controls sensor unit 1 and also performs marker detection process. Main circuit 20 includes an electronic substrate (omitted in the drawings) having implemented thereon a CPU (central processing unit) which performs various arithmetic operations, memory elements such as a ROM (read only memory) and RAM (random access memory), and so forth.

Main circuit 20 includes an input/output port to and from sensor unit 1. As an input port, there are an input port of fourteen channels for the above-described magnetic signals, an input port for the above-described displacement signal, and so forth. As an output port, there are an output port for a control signal to sensor unit 1, an output port for the result of the marker detection process, and so forth.

Main circuit 20 includes data areas M1 to M14 (denoted as Mm as appropriate) and data areas H1 to H14 (denoted as Hm as appropriate) for storing time-series data, filter processing circuit 205 and detection processing circuit 207 which execute arithmetic process. Furthermore, main circuit 20 includes switching circuit 203 which switches detection process for detecting magnetic marker 10.

Data areas Mm are storage areas for storing (saving) data (magnetic gradient in the vehicle-width direction) indicated by magnetic signals of fourteen channels outputted by sensor unit 1 as sensor signals. Data areas Hm are storage areas for storing filter output values by filter processing circuit 205.

Filter processing circuit 205 is a circuit which performs filter process on the time-series data stored in data areas Mm. Detection processing circuit 207 is a circuit which performs marker detection process on the time-series data (filter output values) stored in data areas Hm. Filter processing circuit 205 and detection processing circuit 207 configure a processing circuit which performs a process of detecting magnetic marker 10. The filter process by filter processing circuit 205 and the marker detection process by detection processing circuit 207 configure a detection process for detecting magnetic marker 10. The above-described switching circuit 203 changes filter characteristics of filter processing circuit 205, thereby switching the detection process for detecting magnetic marker 10.

Filter processing circuit 205 is a circuit which performs filter process for each channel on the time-series data of fourteen channels stored in data areas Mm. Filter processing circuit 205 sequentially stores filter output values of the respective channels in the data areas Hm, as described above. In this filter processing circuit 205, a plurality of types of filter characteristics are provided and, by the above-described switching circuit 203, a change to any filter characteristics is made. Note that, while details will be described further below, switching circuit 203 changes the filter characteristics in filter processing circuit 205 in accordance with the displacement measurement value by non-contact displacement sensor 15.

Detection processing circuit 207 is a circuit which performs marker detection process for detecting magnetic marker 10. Marker detection process is performed based on time-series filter output values stored in data areas Hm. In this marker detection process, a process of measuring a lateral shift amount of vehicle 5 with respect to detected magnetic marker 10 is included.

Next, details of (1) displacement measurement and (2) marker detection process by sensor unit 1 and main circuit 20 are sequentially described.

(1) Displacement Measurement

Figure 4:
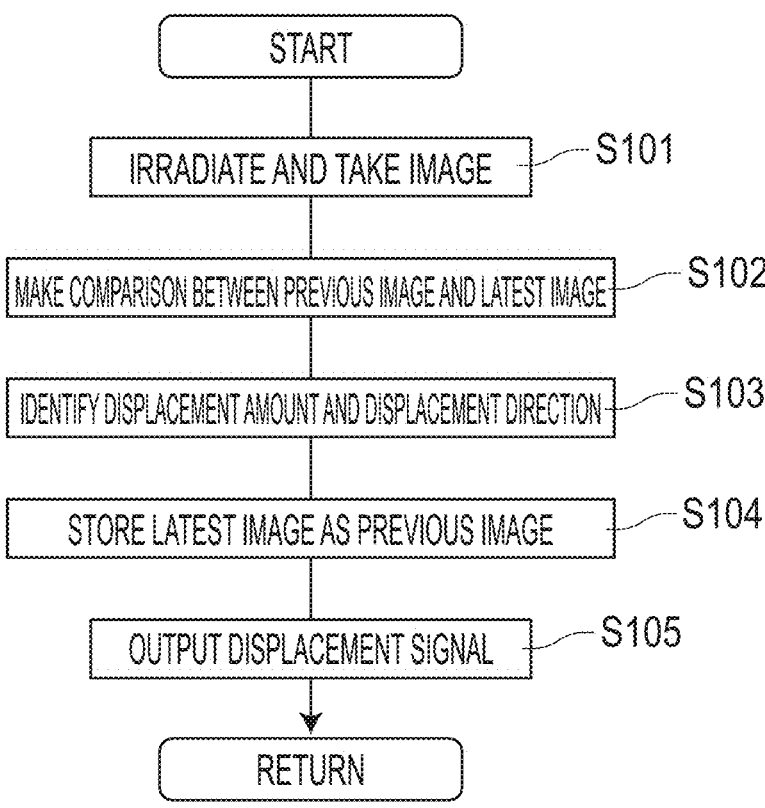
FIG. 4 is a flow diagram depicting a flow of displacement measurement by a non-contact displacement sensor.
Figure 5:
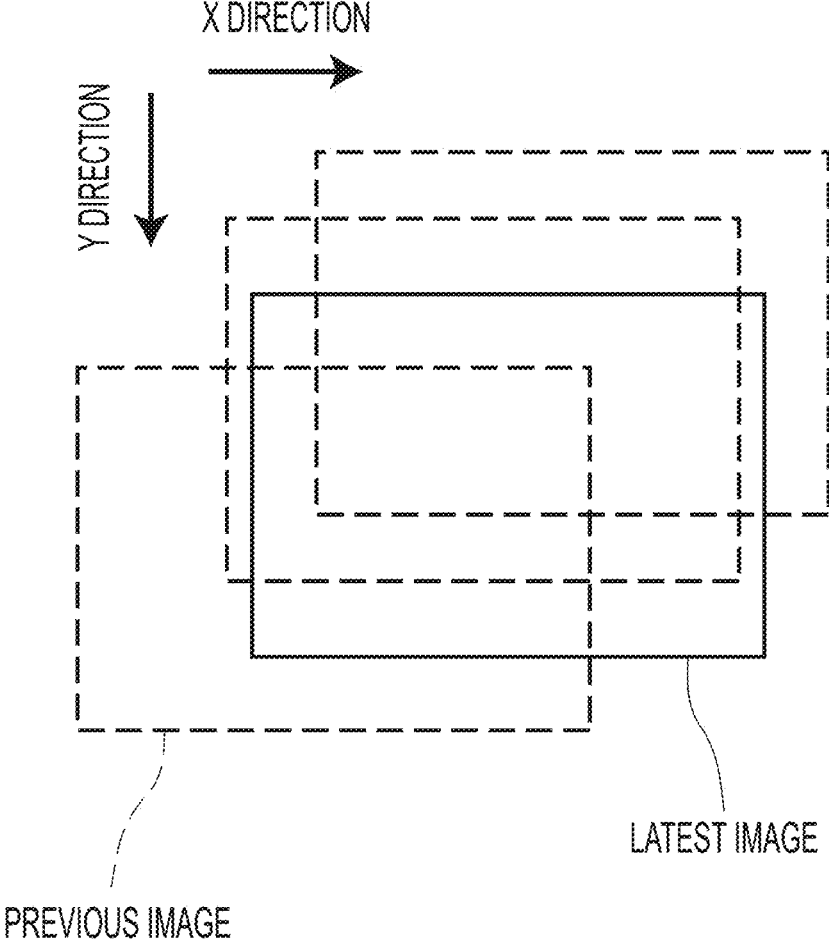
FIG. 5 is a descriptive diagram depicting a state of making a comparison between a previous image and the latest image.

Details of displacement measurement are described with reference to FIG. 4 and FIG. 5 by focusing on the operation of displacement measurement circuit 150 configuring non-contact displacement sensor 15. FIG. 4 is a flow diagram depicting a flow of displacement measurement. FIG. 5 is a descriptive diagram of a state of making a comparison between a previous image and the latest image.

Displacement measurement circuit 150 controls light-source element 151 and image pickup element 153 so that light-emitting operation and image-taking operation are performed as being synchronized. Note that image-taking operation and so forth are performed with a frequency of, for example, 3 kHz. Image pickup element 153 takes an image of an irradiation area on road surface 100S by light-source element 151 (S101). Note that light-source element 151 is configured to broadly irradiate road surface 100S.

Displacement measurement circuit 150 performs comparison between a previous taken image (previous image) acquired in a previous process loop and stored at step S104 described further below and the latest taken image (latest image) acquired at the immediately-previous step S101 (S102). Specifically, as shifting the previous image to an x direction and a y direction as in FIG. 5, displacement measurement circuit 150 checks a correlation (degree of matching) with the latest image.

Displacement measurement circuit 150 calculates a correlation coefficient with the latest image for each position acquired by shifting the previous image and, among the positions acquired by shifting the previous images, identifies a position where the correlation coefficient becomes largest. In this manner, by identifying the position acquired by shifting the previous image, displacement measurement circuit 150 identifies a displacement amount and a displacement direction (displacement measurement value) on an imaging plane (S103). Here, the displacement amount is the length of a vector defined by a shift amount in the x direction and a shift amount in the y direction. The displacement direction is the orientation of this vector.

Upon identifying the displacement amount and the displacement direction in a manner as described above, displacement measurement circuit 150 stores and saves the latest image acquired at step S101 described above as a previous image (S104). By storing and saving the latest image in a manner as described above, it can be referred to as a previous image in the next process loop. Also, displacement measurement circuit 150 outputs a displacement signal indicating the displacement amount and the displacement direction identified at step S103 described above (S105), and inputs the displacement signal to main circuit 20.

(2) Marker Detection Process

Marker detection process is a process to be repeatedly performed with a frequency of 3 kHz by collaborative operation of sensor unit 1 and main circuit 20. Details of this marker detection process are described with reference to a flow diagram of FIG. 6.

In response to control by main circuit 20, sensor unit 1 performs magnetism detection with a frequency of 3 kHz (S201). As described above, in each magnetic sensor Cn, the amorphous wire (omitted in the drawings) as the magneto-sensitive body is disposed along the vehicle-width direction. Magnetism with which magnetic marker 10 acts in the vehicle-width direction heads outside magnetic marker 10. Thus, the magnetic direction in the vehicle-width direction acting on each magnetic sensor Cn is reversed depending on whether the magnetic sensor is on a left side or a right side of magnetic marker 10.

Figure 7:
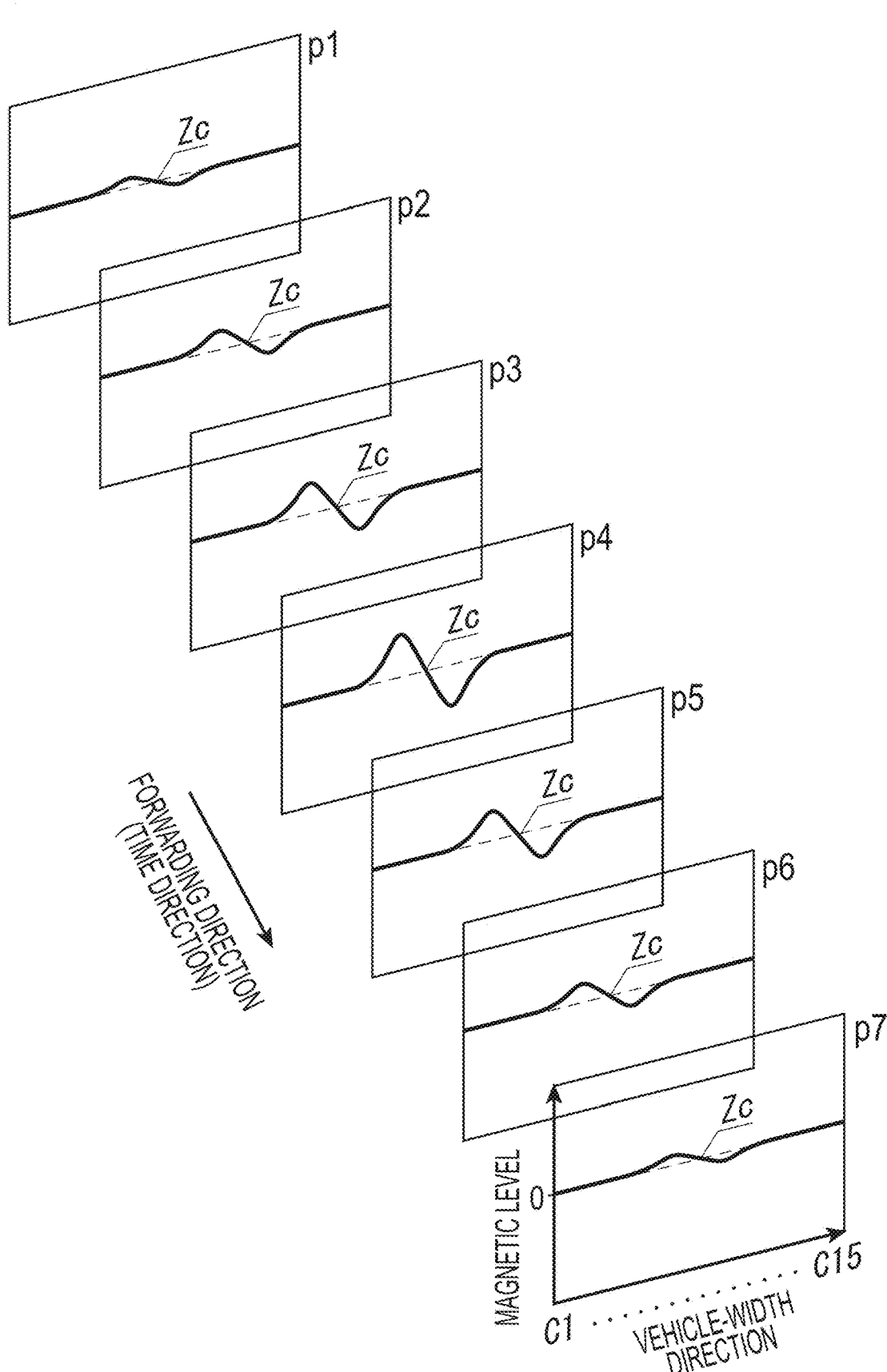
FIG. 7 is a descriptive diagram depicting changes with time of distribution waveforms of magnetism in a vehicle-width direction while passing over a magnetic marker.

FIG. 7 exemplarily depicts temporal changes of a distribution waveforms of magnetism in the vehicle-width direction of a magnetic measurement value (magnetic strength in the vehicle-width direction) by each magnetic sensor Cn configuring sensor unit 1. In the drawing, the forwarding direction (time direction) of vehicle 5 is defined from upper-left position p1 toward lower-right position p7. Position p4 is a position directly above magnetic marker 10. Positions p1→p4 is a zone in which the vehicle approaches magnetic marker 10, and positions p4→p7 is a zone in which the vehicle goes away from magnetic marker 10.

In any distribution waveform of magnetism in the vehicle-width direction at each position in FIG. 7, although the amplitude varies, zero-cross Zc corresponding to the position of magnetic marker 10 in the vehicle-width direction occurs, and a waveform like two mountains is formed, in which the sign is reversed across that zero-cross Zc. When vehicle 5 passes over magnetic marker 10, as vehicle 5 approaches magnetic marker 10, the amplitude of the two-mountain distribution waveform gradually increases and becomes the maximum amplitude at position p4 directly above magnetic marker 10. Then as vehicle 5 goes away from magnetic marker 10, the amplitude of the two-mountain distribution waveform gradually decreases.

In sensor unit 1, the magnetic measurement value of each magnetic sensor Cn is immediately inputted to differential circuit Gm (FIG. 3). For example, to differential circuit G1, magnetic measurement values of magnetic sensors C1 and C2 are inputted, and a differential operation of subtracting the magnetic measurement value of C1 from the magnetic measurement value of C2 is performed (S202). Differential circuit Gm performs differential operation of subtracting the magnetic measurement value of magnetic sensor Cm (m is a natural number of 1 to 14) from the magnetic measurement value of magnetic sensor C(m+1).

The differential operation value of differential circuit Gm is a difference between magnetic measurement values of adjacent two magnetic sensors Cn in sensor unit 1, and indicates a magnetic gradient in the vehicle-width direction. The distribution waveform of the magnetic gradient in the vehicle-width direction is, as exemplarily depicted in each of the graphs at positions p1 to p7 in FIG. 8, is a waveform in which a high mountain has small mountains adjacent thereto on both sides, these small mountains each having the sign reversed to the sign of the high mountain.

Figure 6:
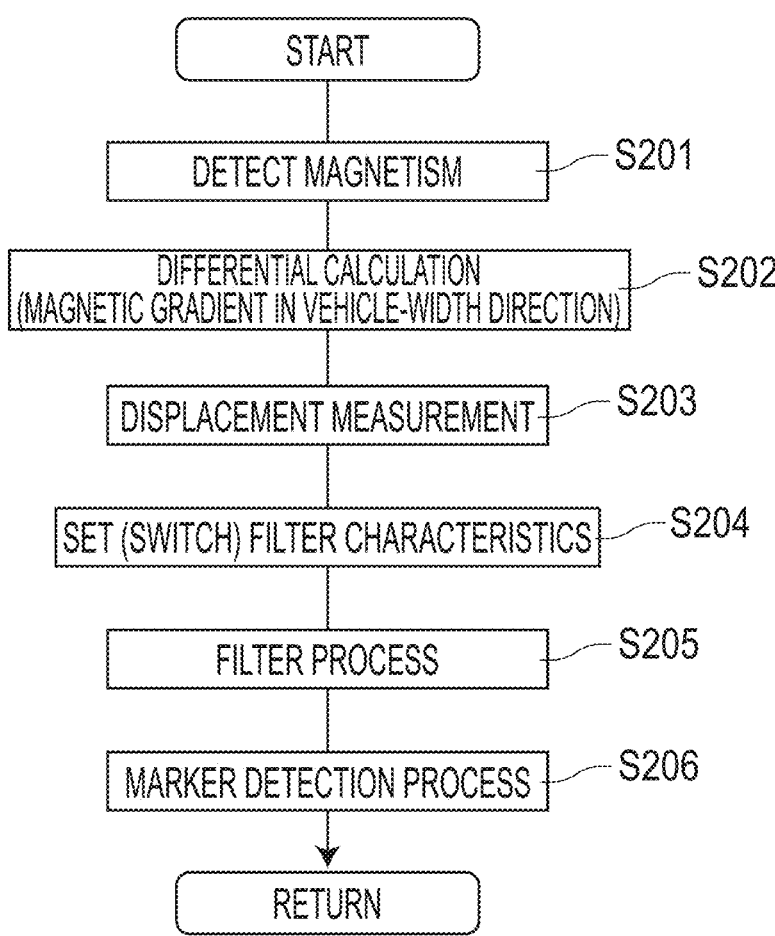
FIG. 6 is a flow diagram depicting a flow of marker detection process.

The differential operation at step S202 in FIG. 6 is effective for removal of common magnetic noise uniformly acting on each magnetic sensor Cn. Common magnetic noise occurs not only from geomagnetism but also from a magnetism generation source that is large in size, such as, for example, an iron bridge or another vehicle. In the case of a large magnetism generation source, since the magnetic field loop from the N pole to S pole becomes exceptionally large, the magnetic field becomes almost uniform at an intermediate position between both of the poles, and magnetism acting on each magnetic sensor Cn becomes almost uniform. The differential operation at step S202 described above is effective also for removal of magnetism almost uniformly acting on each magnetic sensor Cn as described above.

Each differential operation value by differential circuit Gm (one example of an operation value based on a magnetic measurement value) is outputted as a sensor signal of fourteen channels by sensor unit 1 all at once. In main circuit 20, time-series data for each channel based on this sensor signal is stored in data area Mm (FIG. 3). When acquiring a new sensor signal, main circuit 20 deletes the most obsolete data in data area Mm and progressively forwards each data in data area Mm to provide a free-space area. Then, data indicated by the newly-acquired sensor signal is stored in that free-space area. With this storing operation with data area Mm, data of time-series differential operation values (magnetic gradient in the vehicle-width direction) over a predetermined previous period is stored in each channel of data area Mm.

Figure 8:
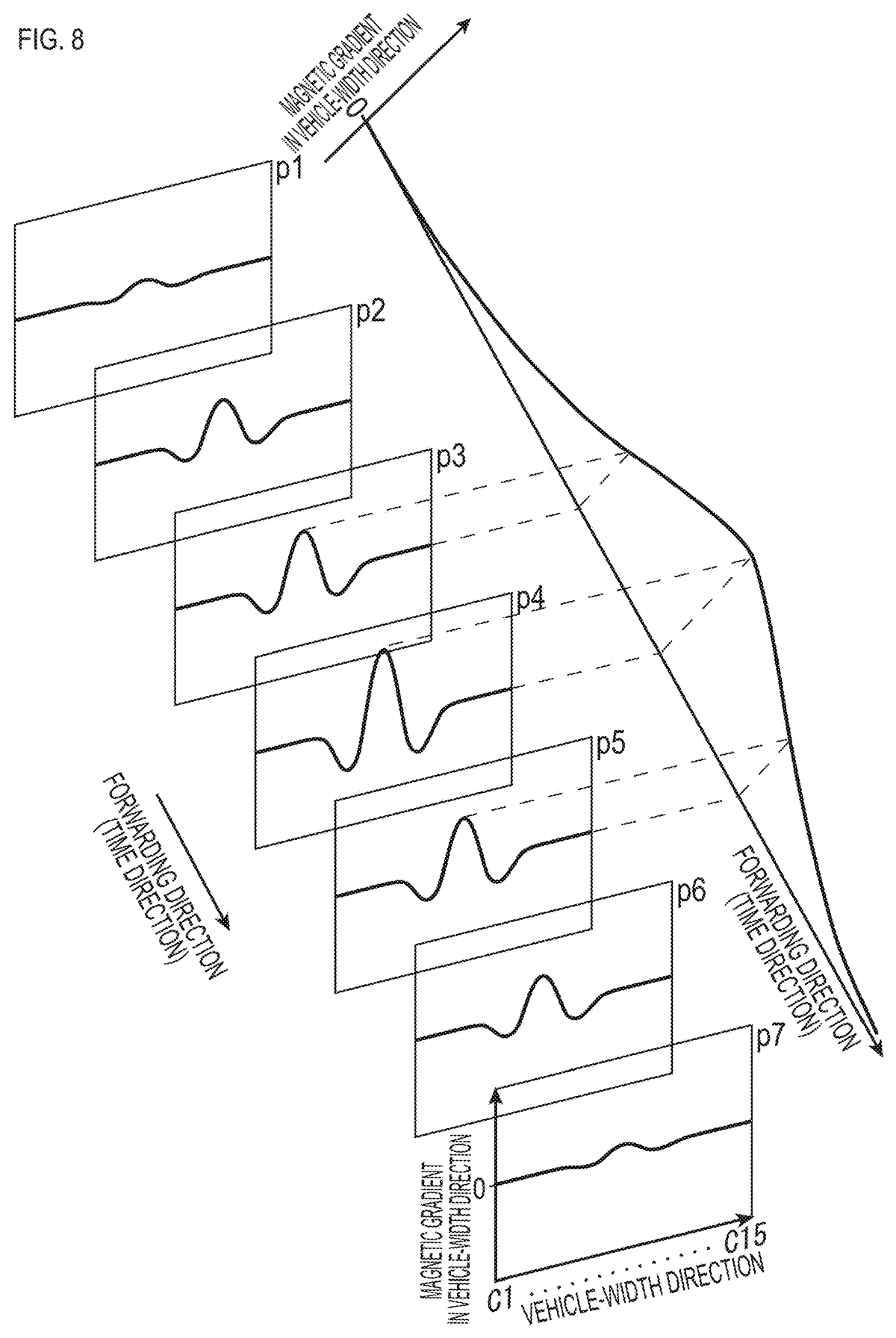

Data of time-series differential operation values (magnetic gradient in the vehicle-width direction) of data area Mm is such that, as in FIG. 8, the amplitude increases as vehicle 5 approaches magnetic marker 10. And, the amplitude becomes maximum at position p4, and forms a distribution like one mountain in which the amplitude decreases as the vehicle goes away from magnetic marker 10. For example, a diagonal graph on a right side on the sheet of FIG. 8 is a graph of temporal changes of the peak value of the magnetic gradient in the vehicle-width direction at each of positions p1 to p7. In this graph, an axis oriented diagonally downward to right in the drawing is defined as the forwarding direction (time direction), and its orthogonal axis is defined as the magnetic gradient in the vehicle-width direction.

Also, at step S203 in FIG. 6, sensor unit 1 uses non-contact displacement sensor 15 to perform displacement measurement described above with reference to FIG. 4 and FIG. 5. The result of displacement measurement (displacement amount and displacement direction) are inputted to main circuit 20 as a displacement signal. This displacement signal is a signal indicating displacement of non-contact displacement sensor 15 relative to road surface 100S, that is, displacement of vehicle 5 relative to road surface 100S.

When capturing the displacement signal from sensor unit 1, main circuit 20 changes the filter characteristics of filter processing circuit 205 to the filter characteristics in accordance with the displacement amount included in the displacement signal (S204). As described above, in filter processing circuit 205, a plurality of types of filter characteristics are set in advance. As will be described further below, main circuit 20 selects any of the plurality of types of filter characteristics in accordance with the above-described displacement amount.

Main circuit 20 inputs time-series data of the magnetic gradient of fourteen channels in the vehicle-width direction stored in data area Mm (m is an integer of 1 to 14) to filter processing circuit 205, and performs filter process for each channel (S205). This filter process is filter process of cutting off low-frequency components and letting high-frequency components pass therethrough. Filter processing circuit 205 calculates a filter output value by convolution operation by an IIR (Infinite Impulse Response) filter with the time-series data in data area Mm, and stores the result in data area Hm (FIG. 3).

Here, the details and effect of the filter process to be performed by filter processing circuit 205 are described. As described above, in the case of a large magnetism generation source such as, for example, a bridge or tunnel, differential operation at step S202 in FIG. 6 exerts a certain effect. However, even in a large magnetism generation source, near an end portion serving as a magnetic pole, a milder magnetic gradient occurs due to wraparound of the magnetic field. The differential operation at step S202 described above removes uniform magnetism, and removing the magnetic gradient is difficult.

When a comparison is made between a large magnetism generation source such as a bridge and a small magnetism generation source such as magnetic marker 10, the distance between the magnetic poles is different, this results in a different change ratio of the magnetic gradient. That is, in the large magnetism generation source with a long distance between the magnetic poles, the distance of a transition from the magnetic gradient of one magnetic pole to the magnetic gradient of the other magnetic pole is long. Thus, changes of the magnetic gradient are mild, and the frequency is low. On the other hand, in the small magnetism generation source such as magnetic marker 10, the distance between the poles is short. Thus, the change ratio of the magnetic gradient is steep and the change ratio is large, and the frequency is high. According to the filter process of cutting off low-frequency components, the magnetic gradient with mild changes derived from the large magnetism generation source and a small change ratio can be removed.

For example, when vehicle passes over any one magnetic marker, the magnetic gradient in the vehicle-width direction by differential operation at step S202 changes as in the diagonal graph on the right side on the sheet of FIG. 8. For example, when vehicle 5 travels along lane 100, a peak is ideally supposed to occur every time the vehicle passes over magnetic marker 10. However, since a magnetism generation source such as, for example, a bridge or tunnel, is present in an actual road environment, there is a high possibility that ideal changes in which a peak periodically appears for each passage over magnetic marker 10 are not acquired and the change is affected by external disturbances of magnetism as in FIG. 9(*a*).

Figure 9:
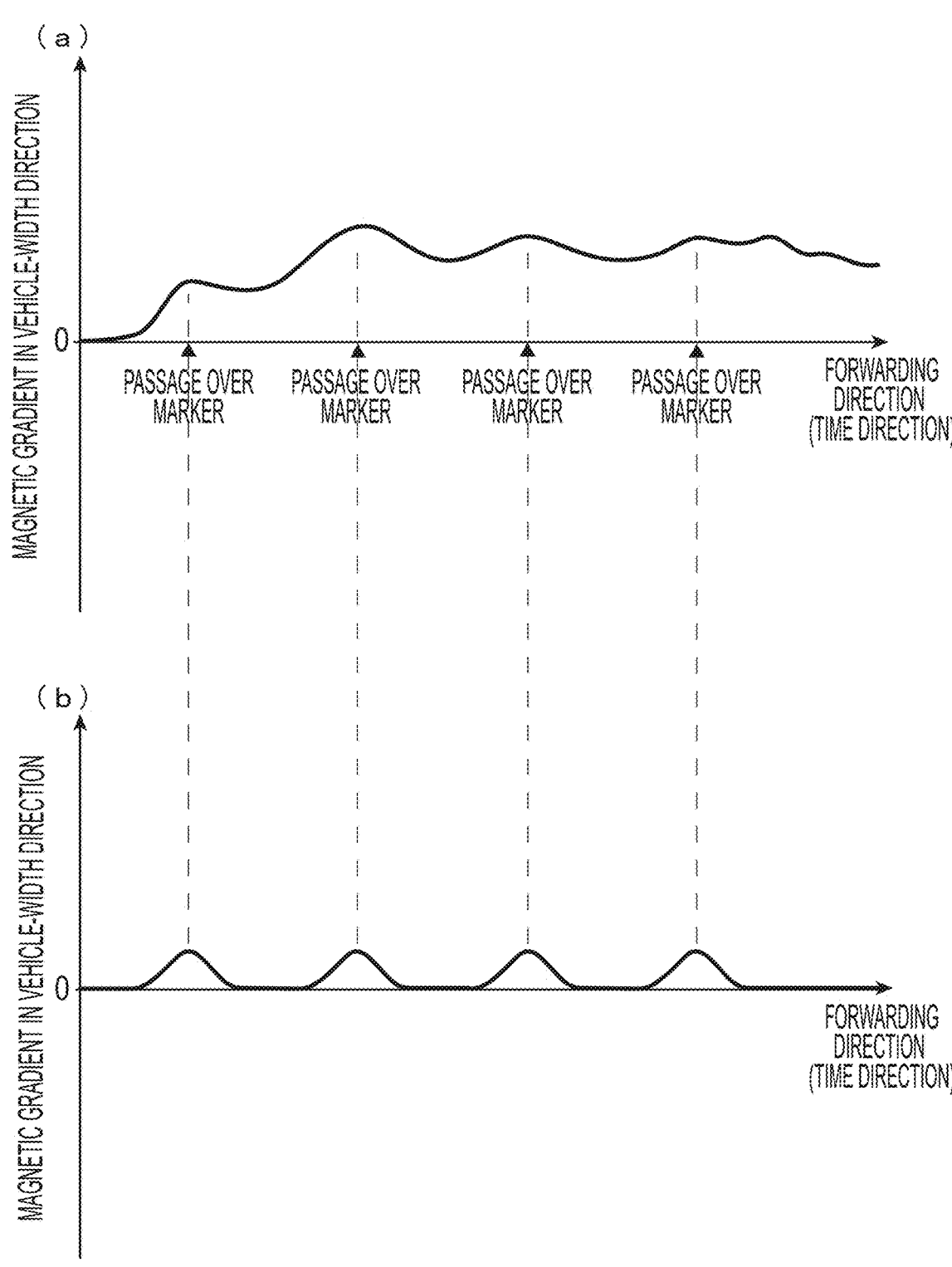
FIG. 9 is a descriptive diagram of filter process.

The filter process by filter processing circuit 205 is a process of cutting off low-frequency components in changes (FIG. 9(*a*)) of the magnetic gradient in the vehicle-width direction as described above. According to this filter process, changes of the magnetic gradient in the vehicle-width direction in the drawing 9(*a*) can be brought closer to ideal changes in which the above-described peak periodically appears as in the drawing 9(*b*).

Here, the plurality of types of filter characteristics set by filter processing circuit 205 and a filter characteristic setting method (changing method, selecting method) are described. A target for the filter process by filter processing circuit 205 is, for example, time-series data indicating temporal changes of the magnetic gradient in the vehicle-width direction in FIG. 9. A purpose of this filter process is, as described above, to remove the influences of the magnetic gradient occurring at an end portion serving as a magnetic pole of a large magnetism generation source such as, a bridge or tunnel and make the magnetic gradient of the surroundings of magnetic marker 10 conspicuous.

For example, as the vehicle speed increases, the time required for passing through an area near an end portion serving as a magnetic pole of a large magnetism generation source such as a bridge or tunnel is shortened. Conversely, as the vehicle speed decreases, the time required for passing through this area is increased. Therefore, in the temporal changes of the magnetic gradient in the vehicle-width direction of FIG. 9, the frequency increases as the vehicle speed increases, and the frequency decreases as the vehicle speed decreases.

In filter processing circuit 205 which performs filter process of removing low-frequency components, a plurality of types of filter characteristics with different cutoff frequencies are set. Filter processing circuit 205 can change the filter characteristics in accordance with the vehicle speed. As filter characteristics, filter characteristics of high cutoff frequencies supporting high-speed traveling, filter characteristics of low cutoff frequencies supporting low-speed traveling, and filter characteristics of intermediate cutoff frequencies supporting intermediate-speed traveling are provided. At step S204 (FIG. 6) described above, in accordance with the displacement amount measured at step S203, the filter process performed by filter processing circuit 205 is changed to any of the three types of filter characteristics described above.

Detection processing circuit 207 (main circuit 20) reads, at step S205, a time-series filter output value (for example, FIG. 9(*b*)) of each channel in data area Hm to perform marker detection process (S206). For example, detection processing circuit 207 selects the channel with the largest fluctuation width among the channels of time-series filter output values. Then, detection processing circuit 207 performs, for example, threshold process, on the time-series filter output value of the selected channel, that is, changes as exemplarily depicted in FIG. 9(*b*). According to the threshold process, for example, from changes of the time-series filter value of FIG. 9(*b*), a peak periodically appearing every time the vehicle passes over magnetic marker 10 can be relatively easily detected.

Furthermore, among the time-series data of the magnetic gradient in the vehicle-width direction stored in data areas Mm (refer to FIG. 3), detection processing circuit 207 reads data for each channel at the time of detection of magnetic marker 10, that is, data configuring the distribution waveform at time point p4 in FIG. 8. Then, detection processing circuit 207 identifies the position of the peak value in the vehicle-width direction among the data configuring this distribution waveform. This position of the peak value in the vehicle-width direction is a position directly above magnetic marker 10 in the vehicle-width direction when sensor unit 1 passes over magnetic marker 10. Therefore, based on this position of the peak value, a lateral shift amount of the vehicle 5 with respect to magnetic marker 10 can be identified. Note that the fact that magnetic marker 10 has been detected and the lateral shift amount with respect to detected magnetic marker 10 are outputted from main circuit 20 as a result of the marker detection process. The result of the marker detection process is inputted to vehicle ECU 30 as described above for use in lane keeping control and so forth.

As described above, sensor unit 1 in vehicle system 1 of the present embodiment includes, in addition to the magnetic sensor, the non-contact displacement sensor. According to this sensor unit 1, the displacement amount of vehicle 5 relative to road surface 100S where magnetic markers 10 are laid can be measured.

Non-contact displacement sensor 15 in the present embodiment is a sensor which measures a displacement of vehicle 5. Non-contact displacement sensor 15 measures a displacement by, as shifting a temporally preceding image among temporally successive images, superposing the temporarily preceding image on a temporally subsequent image to check a degree of matching. In place of shifting the entire image, dividing the image into regions and shifting each region to check a degree of matching may also be preferable. Also, in non-contact displacement sensor 15 of the present embodiment, only a translational movement without rotation is assumed between temporally successive images. In addition to a translational movement, checking rotation is also preferable. In this case, a change in orientation of the vehicle can be measured.

In vehicle system 1 of the present embodiment, in accordance with the displacement amount of vehicle 5, the filter characteristics of the filter process forming part of the marker detection process are changed. By changing the filter characteristics in accordance wit the displacement amount of vehicle 5 as described above, appropriate filter process can be applied in accordance with the vehicle speed, and reliability of detection of magnetic marker 10 can be improved.

In the present embodiment, the example is described in which main circuit 20 which performs filter process and marker detection process is provided separately from sensor unit 1. In place of this, a sensor unit having main circuit 20 integrally incorporated therein may be adopted. Alternatively, a sensor unit may have data areas Mm and filter processing circuit 205 of main circuit 20 integrally incorporated therein. A sensor signal in this case is a filter output value for each channel.

Also in the present embodiment, three types of filter characteristics are set in filter processing circuit 205. In place of this, stepless filter characteristics may be set in accordance with the displacement amount or vehicle speed of vehicle 5. In this case, more appropriate filter process can be performed in accordance with the displacement amount of vehicle 5 or the like.

The filter process to be performed by filter processing circuit 205 of the present embodiment is a high-pass filter which lets high-frequency components pass and cuts off low-frequency components. For this filter process, the cutoff frequency of cutting off low frequencies may be lowered, or the cutoff characteristics of the filter may be mildly set. If the cutoff characteristics are mild, design flexibility of the filter is high, and there is a possibility that calculation loads required for filter process can be decreased. Also, in place of a high-pass filter, a band-pass filter may be adopted which lets frequency components in a range supporting magnetic changes while passing over magnetic marker 10 pass and cuts off frequency components higher and lower than that range.

The detection process of the present embodiment includes filter process on a signal indicating a temporal change of a differential operation value (time-series data of the magnetic gradient in the vehicle-width direction). Here, this differential operation value is one example of a magnetic measurement value by a magnetic sensor or an operation value based on the magnetic measurement value. As filter process, filter process may be on a signal indicating a temporal change of the magnetic measurement value by the magnetic sensor. Filter process may be on a signal indicating a spatial change of the differential operation value. As a spatial change, for example, a change in accordance with the position of vehicle 5 in the forwarding direction, or the like.

A temporal interval of acquiring a magnetic measurement value may be changed so that the positions where magnetic measurement values are acquired by the magnetic sensors are arrayed with a constant distance gap. For example, it may be configured that magnetic measurement may be performed by the magnetic sensors every time the displacement amount measured by the non-contact displacement sensor reaches a predetermined distance such as, for example, 10 mm, 20 mm, 50 mm, or the like. In this case, for magnetic data in the vehicle-width direction, serial data can be acquired in accordance with the position. The series data in this case is data indicating spatial changes. While the magnetic sensors perform magnetic measurement with a sufficiently rapid cycle, the cycle of capturing a sensor signal by main circuit 20 side may be varied from the measurement cycle. For example, main circuit 20 may be configured so as to capture the sensor signal from sensor unit 1 every time vehicle 5 moves a predetermined distance.

While magnetic sensors Cn having sensitivity in the vehicle-width direction is adopted in the present embodiment, a magnetic sensors having sensitivity in the forwarding direction may be adopted, or magnetic sensors having sensitivity in the vertical direction may be adopted. Furthermore, magnetic sensors having sensitivity, for example, in two axial directions of the vehicle-width direction and the forwarding direction, or in two axial directions of the forwarding direction and the vertical direction may be adopted. A magnetic sensor having sensitivity, for example, in three axial directions of the vehicle-width direction, the forwarding direction, and the vertical direction may be adopted. By using a magnetic sensor having sensitivity in a plurality of axial directions, the magnitude of magnetism as well as the acting direction of magnetism can be measured, and a magnetic vector can be generated. By using a difference between magnetic vectors or a change ratio of that difference in the forwarding direction, distinguishing between magnetism of magnetic marker 10 and external disturbances of magnetism may be performed.

One-dimensional filter process for the forwarding direction (time direction) of the vehicle has been exemplarily described. In place of or in addition to this, spatial filter process may be performed on magnetic changes in a two-dimensional space defined by the forwarding direction (time direction) and the vehicle-width direction of the vehicle to remove external disturbances of magnetism. A spatial filter may be applied to magnetic changes in a two-dimensional space defined by the vehicle-width direction and the vertical direction. Furthermore, a space-time filter may be applied to magnetic changes in a space-time area acquired by combining the forwarding direction (time direction) of the vehicle with this two-dimensional space to remove external disturbances of magnetism.

Note that while sensor unit 1 with magnetic sensors arrayed on a single straight line has been exemplarily described in the present embodiment, a sensor unit including only one magnetic sensor can be thought. Alternatively, while the configuration has been exemplarily described in the present embodiment in which one non-contact displacement sensor is incorporated in the sensor unit with magnetic sensors arrayed on the single straight line, a plurality of non-contact displacement sensors may be incorporated. For example, as in FIG. 10, one non-contact displacement sensor 15 may be incorporated at each of both ends of sensor unit 1. Non-contact displacement sensors 15 at both ends are arranged on the single straight line where the magnetic sensors are arrayed or on a straight line parallel to the single straight line.

With two non-contact displacement sensors 15 arranged at both ends of sensor unit 1 each measuring a displacement, changes of the inclination of sensor unit 1, that is, rotational components, can be measured. In this case, not only translational movement defined by the displacement amount and the displacement direction but also a displacement with rotation can be measured. If the displacement of sensor unit 1 can be measured with high accuracy as described above, a displacement of each magnetic sensor configuring sensor unit 1 can be individually identified. Alternatively, a non-contact displacement sensor may be individually provided to correspond to each magnetic sensor so as to be able to identify the displacement of each magnetic sensor. If the displacement of each magnetic sensor can be identified, for example, when filter process is applied to time-series data of the magnetic gradient in the vehicle-width direction, the filter characteristics can be changed for each channel. Note that while the channels of the present embodiment are channels corresponding to differential circuits Gm, if differential circuits Gm are omitted from the configuration, a channel may be provided for each magnetic sensor and the filter characteristics may be changed for each channel.

Furthermore, a sensor unit with magnetic sensor two-dimensionally arrayed may be adopted. In this case, the number of non-contact displacement sensor to be incorporated in the sensor unit may be one, but is preferably plural, two or more. According to two non-contact displacement sensors arranged at different positions, not only the displacement amount and the displacement direction of the sensor unit but also the rotation of the sensor unit can be identified. If the displacement of the sensor unit can be identified with high accuracy, the displacement of each magnetic sensor can be identified with high accuracy, thereby allowing more appropriate process to be applied to data derived from each magnetic sensor. In the present embodiment, as for magnetic sensors Cn arrayed in the vehicle-width direction, a magnetic gradient in the vehicle-width direction is generated by differential operation. In place of or in addition to this, magnetic sensors Cn may be arrayed in the forwarding direction of the vehicle and, for two magnetic sensors arrayed in the forwarding direction, the magnetic gradient in the forwarding direction may be calculated by differential operation.

In the present embodiment, the displacement amount is focused among the displacement measurement values by the non-contact displacement sensor, and the filter characteristics of filter processing circuit 205 are changed in accordance with the displacement amount, thereby switching the detection process for detecting a magnetic marker. In addition to or in place of the displacement amount, the detection process may be switched in accordance with the displacement direction. Furthermore, the detection process may be switched in consideration of the rotational components of the magnetic sensors. Note that the meaning of "displacement" in the description such as the displacement of the vehicle as a movable body and the displacement of the magnetic sensor includes a physical quantity for identifying a displacement, such as a displacement amount and a displacement direction.

Note in the configuration of the present embodiment that magnetic measurement and marker detection process are performed with a constant temporal cycle of 3 kHz. In place of the temporal cycle, magnetic measurement and marker detection process may be performed every time the displacement detected by the non-contact displacement sensor reaches 5 cm. In this case, displacement measurement by the non-contact displacement sensor is preferably performed repeatedly with a sufficiently rapid temporal cycle of, for example, 10 kHz. For example, it is preferable to set, as the cycle of displacement measurement, the cycle to the extent that a fast-moving vehicle moves 0.2 cm to 1 cm.

As described above, when magnetic measurement and marker detection process are performed every time the vehicle is displaced by a predetermined amount (predetermined distance), changes exemplarily depicted on a right side on the sheet of FIG. 8 and changes exemplarily depicted in FIG. 9 are not temporal changes but positional changes. The positional changes do not vary if the vehicle speed is high and the displacement amount measured by the non-contact displacement sensor is large or the vehicle speed is low and the displacement amount measured by the non-contact displacement sensor is small. Therefore, in processing the positional changes, there is less need to switch the filter characteristics in accordance with the displacement amount measured by the non-contact displacement sensor.

On the other hand, for example, when a comparison is made between an expressway and a general road, the specifications in size often vary in general, such as the size of a bridge and the scale of a tunnel. If the size of a structure such as a bridge that can be a large magnetism generation source varies, a variation of the magnetic gradient occurring at an end portion serving as a magnetic pole can occur. Thus, the characteristics of filter process for suppressing the influence of the magnetic gradient that can occur at an end portion of the large magnetism generation source such as a bridge may be switched between the expressway where the scale of a bridge and/or tunnel is large and a general road where the scale of a bridge and/or tunnel is small. Here, a distinction whether the vehicle is traveling an expressway or a general road may be made based on, for example, the result of identifying the road where the vehicle is traveling by a map matching function of a navigation system or may be made in accordance with the displacement amount per constant time (that is, vehicle speed) or the traveling pattern.

In the foregoing, while specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST

1 sensor unit
Cn magnetic sensor
1S vehicle system (system)
10 magnetic marker
100S road surface (surface)

15 non-contact displacement sensor
150 displacement measurement circuit
151 light source element
153 imaging element
20 main circuit
203 switching circuit
205 filter processing circuit
207 detection processing circuit
30 vehicle ECU
5 vehicle

The invention claimed is:

1. A sensor unit to be attached to a movable body to detect a magnetic marker, the sensor unit comprising:
   at least one magnetic sensor which measures magnetism acting from the magnetic marker; and
   at least one non-contact displacement sensor which measures a displacement of the movable body relative to a surface where the magnetic marker is laid, wherein
   the at least one non-contact displacement sensor includes
      a light source which irradiates light onto the surface,
      an imager which captures images of the surface in synchronism with light emitting operation of the light source, and
      a circuit configured to calculate the displacement by identifying an amount of shift which results in a highest match between two temporally successive images when one of the two temporally successive images is positionally shifted by the amount of shift and compared with the other of the two temporally successive images.

2. The sensor unit in claim 1, wherein
   the at least one magnetic sensor is a plurality of magnetic sensors,
   the at least one non-contact displacement sensor is a plurality of non-contact displacement sensors,
   the plurality of magnetic sensors is arrayed on a single straight line, and
   at least two of the plurality of non-contact displacement sensors are arranged on a straight line parallel to the single straight line.

3. The sensor unit in claim 2, further comprising:
   a circuitry configured to
      perform a detection process for detecting the magnetic marker by processing magnetic measurement values measured by the plurality of magnetic sensors, and
      switch the detection process in accordance with displacement measurement values measured by the plurality of non-contact displacement sensors, wherein
   the detection process includes a process to which time-series magnetic measurement values measured by one magnetic sensor among the plurality of magnetic sensors are subjected, and
   the circuitry is further configured to
      identify a displacement of each magnetic sensor configuring the plurality of magnetic sensors based on the displacement measurement values measured by the plurality of non-contact displacement sensors, and
      individually change, for the each magnetic sensor, the process to which the time-series magnetic measurement values are subjected, in accordance with the displacement of the each magnetic sensor.

4. The sensor unit in claim 3, wherein
   the detection process includes a filter process on a signal indicating a temporal or spatial change of the magnetic measurement values measured by the plurality of magnetic sensors or operation values based on the magnetic measurement values, and
   the circuitry is further configured to switch the detection process by changing filter characteristics of the filter process in accordance with the displacement measurement values measured by the plurality of non-contact displacement sensors.

5. The sensor unit in claim 2, further comprising:
   circuitry configured to
      acquire, in parallel, magnetic measurement values measured by the plurality of magnetic sensors,
      identify a displacement of each magnetic sensor configuring the plurality of magnetic sensors based on the displacement measurement values measured by the plurality of non-contact displacement sensors, and
      individually change, for the each magnetic sensor, a temporal interval for acquiring the magnetic measurement values in accordance with the displacement of the each magnetic sensor.

6. The sensor unit in claim 5, wherein
   the circuitry is further configured to change the temporal interval for acquiring the magnetic measurement values so that positions where the magnetic measurement values have been acquired can be arrayed with a constant distance gap.

7. The sensor unit in claim 2, further comprising:
   circuitry configured to
      perform a detection process for detecting the magnetic marker by processing magnetic measurement values measured by the plurality of magnetic sensors, and
      switch the detection process in accordance with displacement measurement values measured by the plurality of non-contact displacement sensors.

8. The sensor unit in claim 1, wherein
   the at least one magnetic sensor is a plurality of magnetic sensors,
   the at least one non-contact displacement sensor is a plurality of non-contact displacement sensors,
   the plurality of magnetic sensors is two-dimensionally arrayed, and
   at least two of the plurality of non-contact displacement sensors are arranged at different positions.

9. The sensor unit in claim 1, wherein
   the at least one magnetic sensor is a plurality of magnetic sensors,
   the at least one non-contact displacement sensor is a plurality of non-contact displacement sensors, and
   the plurality of non-contact displacement sensors is respectively disposed to the plurality of magnetic sensors so that each of the plurality of non-contact displacement sensors is able to individually measure a displacement of each of the plurality of magnetic sensors relative to the surface.

10. The sensor unit in claim 1, further comprising:
   circuitry configured to
      perform a detection process for detecting the magnetic marker by processing a magnetic measurement value measured by the at least one magnetic sensor, and
      switch the detection process in accordance with a displacement measurement value measured by the at least one non-contact displacement sensor.

11. The sensor unit in claim 10, wherein
   the detection process includes a filter process on a signal indicating a temporal or spatial change of the magnetic measurement value measured by the at least one magnetic sensor or an operation value based on the magnetic measurement value, and the circuitry is further configured to switch the detection process by changing filter characteristics of the filter process in accordance with the displacement measurement value measured by the at least one non-contact displacement sensor.

12. A sensor unit to be attached to a movable body to detect a magnetic marker, the sensor unit comprising:

at least one magnetic sensor which measures magnetism acting from the magnetic marker;

at least one non-contact displacement sensor which measures a displacement of the movable body relative to a surface where the magnetic marker is laid; and circuitry configured to acquire magnetic measurement values measured by the at least one magnetic sensor, and change a temporal interval for acquiring the magnetic measurement values in accordance with a displacement measurement value measured by the at least one non-contact displacement sensor.

13. The sensor unit in claim 12, wherein the circuitry is further configured to change the temporal interval for acquiring the magnetic measurement values so that positions where the magnetic measurement values have been acquired can be arrayed with a constant distance gap.

14. A system to detect a magnetic marker, the system comprising:

a movable body; and a sensor unit attached to the movable body, wherein the sensor unit includes at least one magnetic sensor which measures magnetism acting from the magnetic marker, and at least one non-contact displacement sensor which measures a displacement of the movable body relative to a surface where the magnetic marker is laid, wherein the at least one non-contact displacement sensor includes a light source which irradiates light onto the surface, an imager which captures images of the surface in synchronism with light emitting operation of the light source, and a circuit configured to calculate the displacement by identifying an amount of shift which results in a highest match between two temporally successive images when one of the two temporally successive images is positionally shifted by the amount of shift and compared with the other of the two temporally successive images.

15. The system in claim 14, further comprising:

circuitry configured to perform a detection process for detecting the magnetic marker by processing a magnetic measurement value measured by the at least one magnetic sensor, and switch the detection process in accordance with the displacement measured by the at least one non-contact displacement sensor.

16. The system in claim 15, wherein the detection process includes a filter process on a signal indicating a temporal or spatial change of the magnetic measurement value measured by the at least one magnetic sensor or an operation value based on the magnetic measurement value, and the circuitry is further configured to switch the detection process by changing filter characteristics of the filter process in accordance with a displacement measurement value measured by the at least one non-contact displacement sensor.

17. The system in claim 16, wherein the movable body is a vehicle traveling a road, and the circuitry is further configured to switch the detection process in accordance with a type of the road where the movable body travels.

18. The system in claim 15, wherein the movable body is a vehicle traveling a road, and the circuitry is further configured to switch the detection process in accordance with a type of the road where the movable body travels.

19. The system in claim 14, wherein the sensor unit further includes circuitry configured to acquire magnetic measurement values measured by the at least one magnetic sensor, and change a temporal interval for acquiring the magnetic measurement values in accordance with a displacement measurement value measured by the at least one non-contact displacement sensor.

20. The system in claim 19, wherein the circuitry is further configured to change the temporal interval for acquiring the magnetic measurement values so that positions where the magnetic measurement values have been acquired can be arrayed with a constant distance gap.

* * * * *